United States Patent
Levinshtein et al.

(10) Patent No.: US 12,165,285 B2
(45) Date of Patent: Dec. 10, 2024

(54) SEMI-GLOBAL NEURAL IMAGE ALIGNMENT

(71) Applicant: SAMSUNG ELECTRONICS CO., LTD., Suwon-si (KR)

(72) Inventors: Aleksai Levinshtein, Vaughan (CA); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/051,707

(22) Filed: Nov. 1, 2022

(65) Prior Publication Data
US 2024/0144434 A1 May 2, 2024

(51) Int. Cl.
| G06T 5/50 | (2006.01) |
| G06V 10/44 | (2022.01) |
| G06V 10/80 | (2022.01) |
| G06V 10/82 | (2022.01) |
| H04N 5/14 | (2006.01) |

(52) U.S. Cl.
CPC .......... *G06T 5/50* (2013.01); *G06V 10/44* (2022.01); *G06V 10/803* (2022.01); *G06V 10/82* (2022.01); *H04N 5/145* (2013.01); *G06T 2207/20221* (2013.01)

(58) Field of Classification Search
None
See application file for complete search history.

(56) References Cited

U.S. PATENT DOCUMENTS

| 10,853,951 | B2 | 12/2020 | Abdelhak et al. |
| 11,430,134 | B2 | 8/2022 | Zhang et al. |
| 11,638,025 | B2 | 4/2023 | Pourreza et al. |
| 2015/0029306 | A1 | 1/2015 | Cho et al. |
| 2015/0131863 | A1 | 5/2015 | Cui et al. |
| 2021/0004969 | A1 | 1/2021 | Pourian et al. |
| 2021/0065379 | A1* | 3/2021 | Zhang ............... G06V 10/82 |
| 2022/0198616 | A1 | 6/2022 | Lee et al. |
| 2022/0301190 | A1 | 9/2022 | Kwak et al. |
| 2022/0414896 | A1* | 12/2022 | Ma ............... G06T 5/70 |

FOREIGN PATENT DOCUMENTS

| CN | 106658023 B | * 12/2019 | ............ G01C 22/00 |
| KR | 10-2022-0129976 A | 9/2022 | |

OTHER PUBLICATIONS

Dosovitskiy et al., "FlowNet: Learning Optical Flow with Convolutional Networks," Computer Vision Foundation, ICCV 2015, pp. 2758-2766, 2015.
Sun et al., "PWC-Net: CNNs for Optical Flow Using Pyramid, Warping, and Cost Volume," Computer Vision Foundation, CVPR 2018, pp. 8934-8943, 2018.
Teed et al., "RAFT: Recurrent All Pairs Field Transforms for Optical Flow," ECCV 2020, pp. 1-17, 2020.

(Continued)

*Primary Examiner* — Yingchun He
(74) *Attorney, Agent, or Firm* — Sughrue Mion, PLLC

(57) ABSTRACT

Image alignment is achieved by obtaining a fused optical flow based on a global motion estimate and an optical flow estimate. The fused optical flow may be used to warp the first image and/or the second image into aligned features or aligned images. An output image may then be obtained by combining.

17 Claims, 7 Drawing Sheets

(56) References Cited

OTHER PUBLICATIONS

Detone et al., "Deep Image Homography Estimation," RSS workshops 2016, arXiv:1606.03798v1 [cs.CV], Jun. 13, 2016, Total 6 pages.
Ranftl et al., "Deep Fundamental Matrix Estimation," Computer Vision Foundation, ECCV 2018, pp. 1-16, 2018.
International Search Report (PCT/ISA/210) issued Jan. 24, 2024 by the International Searching Authority in International Patent Application No. PCT/KR2023/014984.
Written Opinion (PCT/ISA/237) issued Jan. 24, 2024 by the International Searching Authority in International Patent Application No. PCT/KR2023/014984.
Jiang, Shihao et al., "Learning to Estimate Hidden Motions with Global Motion Aggregation", arXiv:2104.02409v3 [cs.CV], Jul. 29, 2021. (13 pages total).

\* cited by examiner

SEMI-GLOBAL NEURAL IMAGE ALIGNMENT

FIELD

The present disclosure is related aligning and fusing multiple images to obtain a high quality image.

BACKGROUND

Convolutional neural networks may be used in computer vision, which may use optical flow. Optical flow estimation is the task of determining how the information content of a pixel or pixels in a first image has moved and appears in different pixels in a second image. An optical flow is a vector field between two images. As an example, an optical flow may show how an object in a first image can be moved to form the same object in the second image. The first and second image may be from a burst of images taken by a same camera, or images from two different cameras with different views of at least a portion of a same scene.

Image alignment is a component for many image processing tasks, such as burst photography or video enhancement. In such tasks, multiple images are aligned and fused together into a single high-quality image.

Neural networks can be used in the process of image alignment. However, images in real scenes are challenging to align as they often contain both camera and object motion. The images may also have inter-frame appearance variation due to noise, exposure, or lighting variation.

SUMMARY

Embodiments closely model a combination of global and local motion using neural networks. For example, in some embodiments, a neural network analyzes which areas of the image are moving globally (global motion areas) and which are moving locally. Embodiments then use global image information for a reliable estimation of global motion in the global motion areas while using local information to estimate local motion. Embodiments provide accurate alignment for real scenes under conditions of camera and object motion, and also conditions of the images having inter-frame appearance variation due to noise, exposure, or lighting variation. Embodiments provide a more accurately aligned burst, which improves fusion and results in improved output image quality in an output image.

Provided herein is a method of forming an output image, the method comprising: extracting a plurality of features from a plurality of images, the plurality of features comprising a plurality of first features associated with a first image of the plurality of images and a plurality of second features associated with a second image of the plurality of images; performing a global motion estimation based on the plurality of features to obtain a global optical flow estimate; performing an optical flow estimation based on the plurality of features to obtain a local optical flow estimate; fusing the global optical flow estimate and the local optical flow estimate to obtain a fused optical flow estimate; and forming the output image based on the fused optical flow estimate.

Also provided herein is a non-transitory computer readable medium storing instructions for forming an output image, the instructions configured to cause a computer to at least: extract a plurality of features from a plurality of images, the plurality of features comprising a plurality of first features associated with a first image of the plurality of images and a plurality of second features associated with a second image of the plurality of images; perform a global motion estimation based on the plurality of features to obtain a global optical flow estimate; perform an optical flow estimation based on the plurality of features to obtain a local optical flow estimate; fuse the global optical flow estimate and the local optical flow estimate to obtain a fused optical flow estimate; and form the output image based on the fused optical flow estimate.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Comparative neural alignment models (not embodiments) target either purely local motion, i.e. optical flow, or global motion such as homography or epipolar geometry estimation, but not both.

Figure 2A:
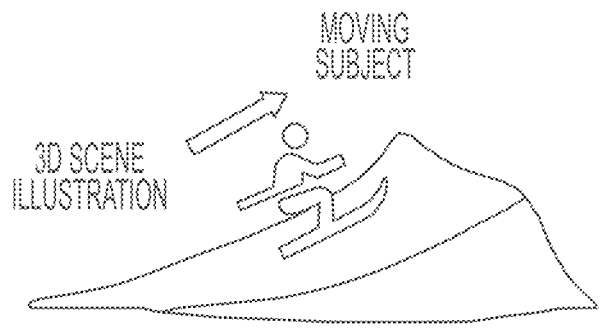
FIG. 2A schematically illustrates a scene which includes a moving subject.
Figure 2B:
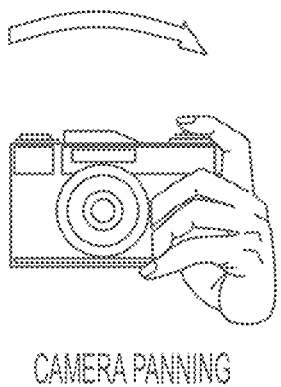
FIG. 2B schematically illustrates an image being acquired while a camera is being panned.

In reality, most scenes contain a mixture of global and local motion, with global motion resulting from the 3D translation and rotation of the camera while imaging a static scene, especially if the camera is being hand held, and local motion resulting from independently moving objects in the scene. Please see FIG. 2A (subject is moving) and FIG. 2B (camera is panning, that is, moving).

Figure 3B:
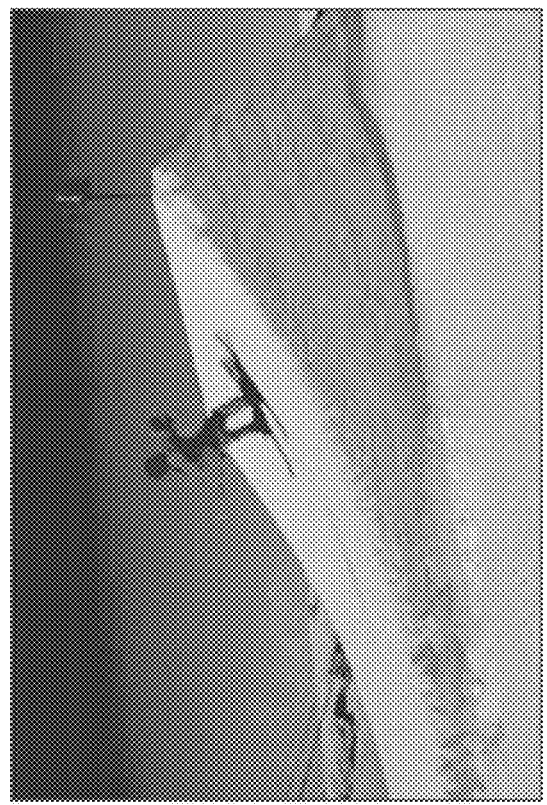
FIG. 3A and FIG. 3B illustrate an example image 1 and image 2, respectively.
Figure 3A:
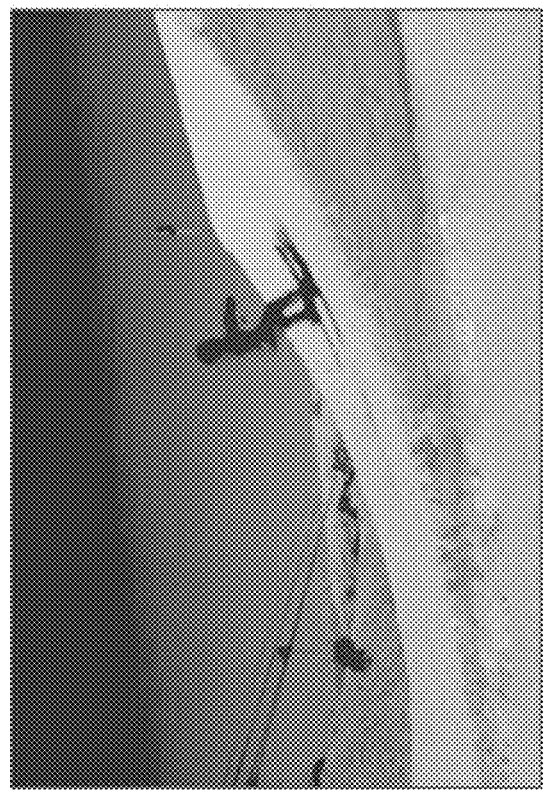

In image 1 and image 2 of FIG. 3A and FIG. 3B, the snowy hill is a static background and the skier is an independently moving object. The camera is panning to the right, causing the image to move to the left, while the skier is moving independently up the hill. While it is possible to explain all motion in the scene using local motion models, it may not be reliable in regions of poor contrast or regions that otherwise undergo significant appearance variation (due to fast motion, noise, exposure, or lighting variation). Embodiments target the problem of modeling the combination of global and local motion in a real scene within a neural network framework, leading to better alignment.

Figure 1:
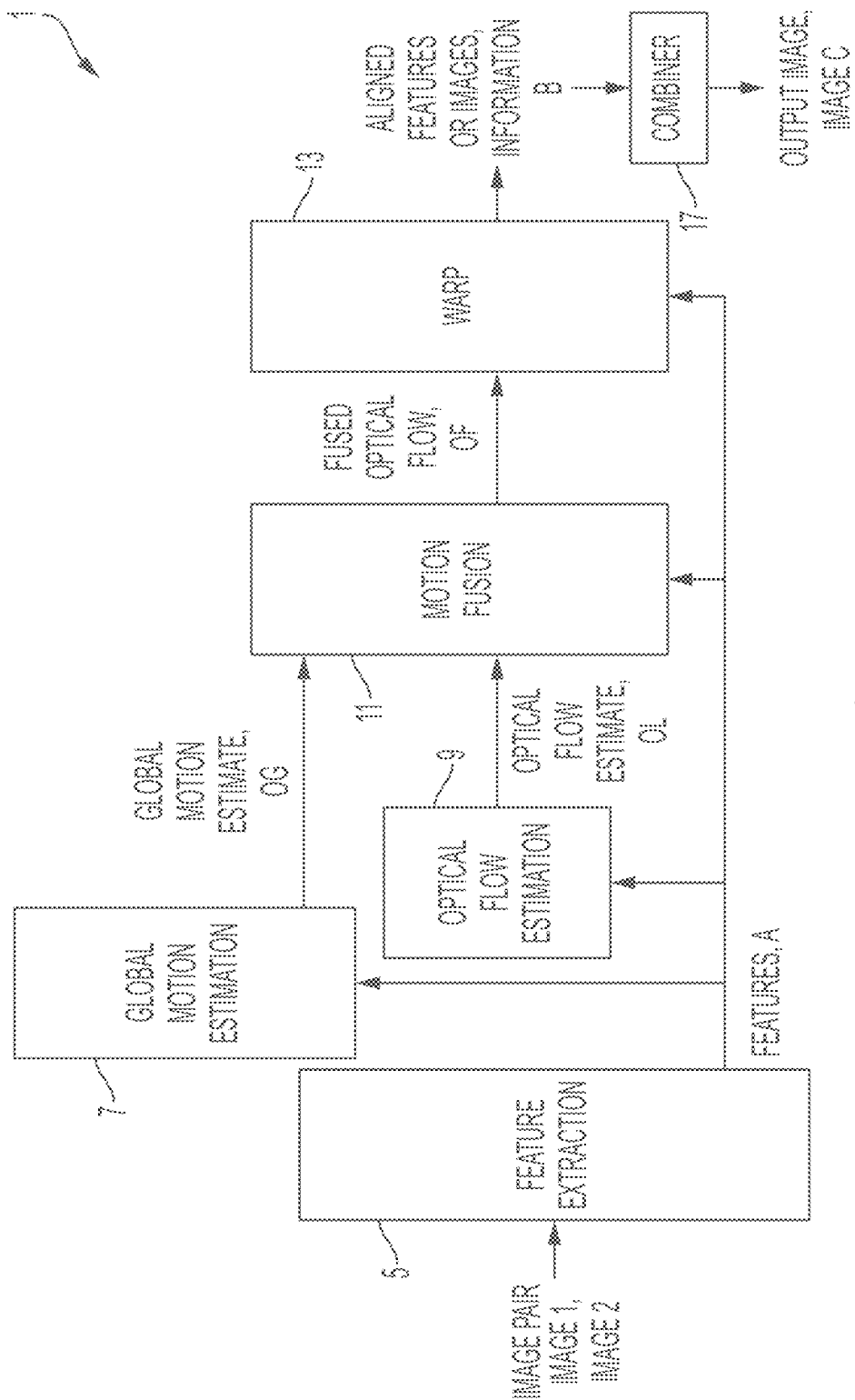
FIG. 1 illustrates a system for aligning an image pair and obtaining an output image, according to some embodiments.

Embodiments closely model real scene motion and get better alignment by extending existing optical flow networks with two novel components. system 1 of an example embodiment is shown in FIG. 1.

Embodiments provide global motion estimation (FIG. 1 item 7). Embodiments include robust global motion estimation and are able to support a range of simple to complex global motion models. The global motion estimation may be integrated within an existing optical flow network.

Embodiments also provide motion fusion (FIG. 1 item 11). Embodiments include coherent fusion of motion predictions from global motion estimation 7 and a local optical flow estimator 9, yielding a fused optical flow OF (OF is an optical flow field) that can be used for warping (FIG. 1 item 13).

FIG. 1 illustrates a system 1 for determining an optical flow of two or more images. In FIG. 1, feature extraction 5 operates on two or more images to obtain features A. Global motion estimation 7 operates on the features A to obtain a global motion estimate OG. Optical flow estimation 9 also operates on the features A to produce optical flow estimate OL. Motion fusion 11 fuses the global motion estimate OG and the optical flow estimate OL to obtain a fused optical flow, OF. Warp 13 the operations on the features A using the fused optical flow OF and provides aligned features or images, referred to collectively as information B. Information B may be combined by combiner 17 to provide an output image, referred to as image C.

Thus, embodiments include warping a second image based on the fused optical flow estimate to obtain a warped second image, and combining the first image with the warped second image to obtain the output image.

In some embodiments, of the method, K is two or more, the method further comprising: fitting, using the DLT, a first homography of the K homographies to the plurality of first features; and fitting, using the DLT, a second homography of the K homographies to the plurality of second features.

In further detail, comparative optical flow estimators extract features (FIG. 1, item 5). The features may be used to compute an optical flow OL.

Figures 4A, 4B:
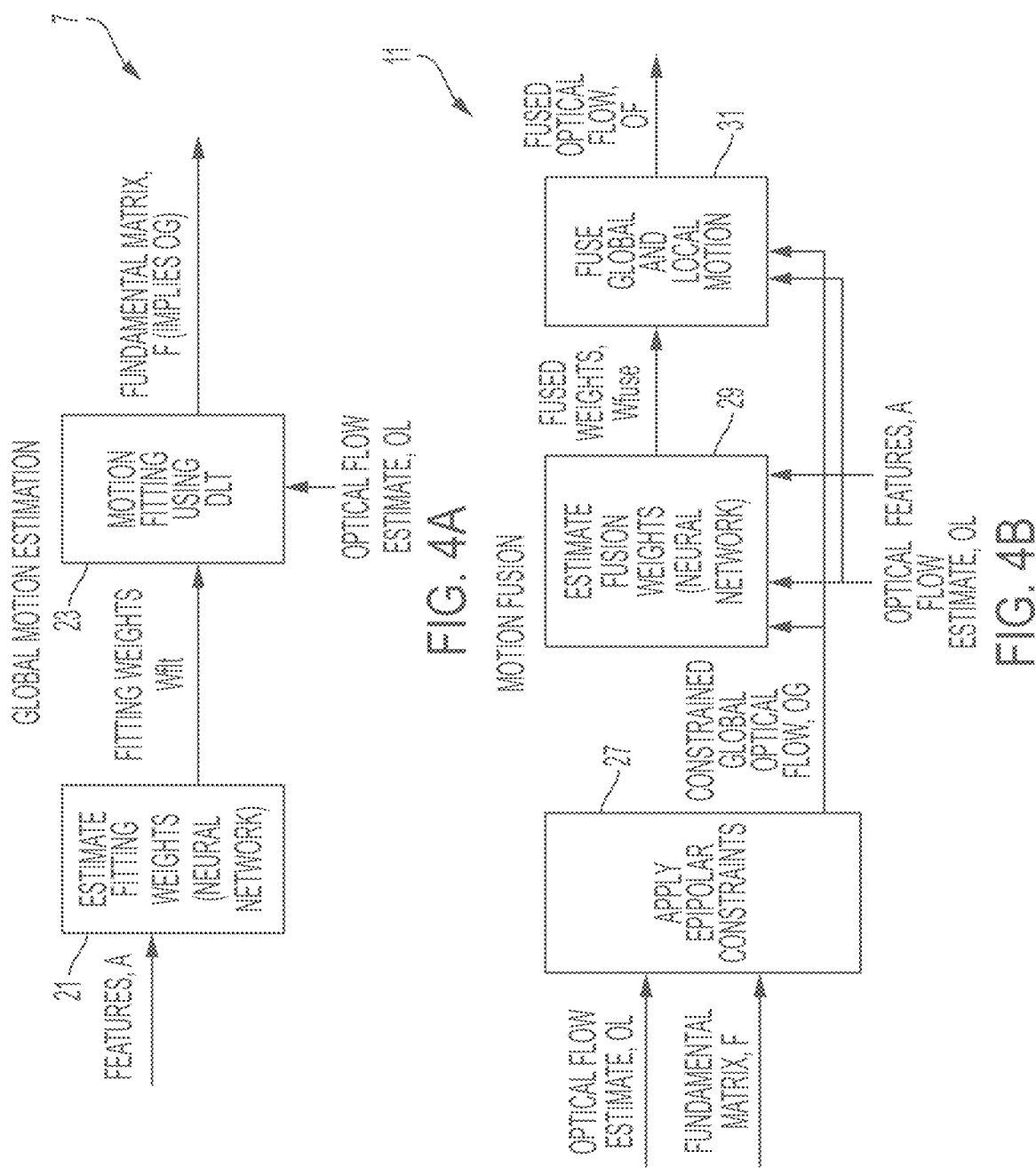
FIG. 4A illustrates a system for obtaining a fundamental matrix, according to some embodiments.
FIG. 4B illustrates a system for motion fusion, according to some embodiments.
Figure 5:
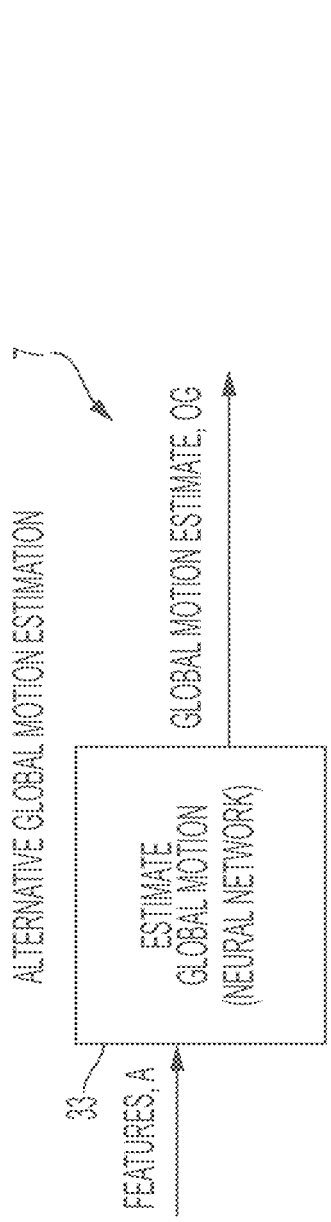
FIG. 5 illustrates an alternative embodiment for obtaining a global motion estimate.

In embodiments, global motion estimation 7, takes features A and optical flow estimate OL as input (see FIG. 1). Embodiments robustly compute global motion. FIG. 4A illustrates computing global motion by estimating weights (Wfit) mapping to reliable regions of global motion and then using an analytical robust fitting method, for example direct linear transformation (DLT) to fit a global motion model to optical flow vectors. In an alternative embodiment, global motion parameters are estimated directly using a neural network (FIG. 5). The global motion estimation 7 is applicable to a variety of global motion models. For example, FIG. 4A models global motion using a fundamental matrix F. Also, global motion may be obtained based on a set of homographies one or more homographies (see FIG. 6).

Embodiments also provide motion fusion 11 (see FIG. 1). Motion fusion 11 has inputs of global and local motion estimates (OG and OL, respectively), as well as features A, and produces a single optical flow estimate (fused optical flow OF). Motion fusion 11 first converts global motion estimate OG into an optical flow representation, which is done differently depending on which global model is being used. Then fusion weights Wfit are estimated for a weighted average of global and local optical flow.

Comparative optical flow estimators are multistage.

FIG. 1 illustrates modifications to a single stage optical flow estimator. Embodiments include making the same modifications for a multistage estimator by applying the modifications at each stage.

FIG. 4A illustrates an embodiment of the global motion estimation 7 of FIG. 1. Features A are processed to estimate fitting weights (item 21, a neural network) and produce fitting weights Wfit. The neural network is trained offline using known techniques. See Table 2 below regarding training a neural network.

The fitting weights Wfit are applied to the optical flow estimate OL to perform motion fitting using a direct linear transformation (DLT) (item 23), thereby obtaining a fundamental matrix F which contains information about a global optical flow. DLT is a technique for solving a set of variables from a set of similarity relations $x_k \propto A\, y_k$ for k=1, . . . , N. DLT is needed when the defining equation differ by an unknown multiplicative factor dependent on k.

DLT may be used to find a homography between image 1 and image 2. For example, for global motion, the regions in a scene may be modeled as being in a same plane. A region of image 1 and another region of image 2 may be modeled as being on a same planar surface in space related by a homography. An example homography matrix H between point (x', y') in a first plane and point (x, y) in a second plane, with a scale factor s, is given below.

$$s \begin{bmatrix} x' \\ y' \\ 1 \end{bmatrix} = H \begin{bmatrix} x \\ y \\ 1 \end{bmatrix},$$

where H is a 3×3 matrix with $H_{i,j}=h_{i,j}$ and $h_{3,3}=1$.

Thus, in some embodiments, global motion estimation includes estimating, based on a plurality of features such as features A, fitting weights using a first neural network to obtain robust weights; and motion fitting, using a DLT, based on the robust weights and based on the local optical flow estimate to obtain the global optical flow estimate. In some embodiments, the global optical flow estimate is represented in the form of the fundamental matrix F.

In further detail regarding FIG. 4A, the output of global motion estimation 7 is a fundamental matrix, F. The fundamental matrix is used to represent global motion constraints. The fundamental matrix F accurately models camera motion for static 3D scenes taken with an unknown camera (see FIG. 2B).

Assuming that the features A from the neural optical flow model are a W×H×C dimensional tensor, the global motion estimation 7 starts by reusing them for estimating robust weights $W_{fit}$, an W×H tensor, using the neural network of item 21 (in some instances this is a convolutional neural subnetwork). Intuitively, for a pixel p, a high value of $W_{fit}(p)$ means that p belongs to a globally moving area of the scene and the optical flow estimate at p, $O_L(p)$, is reliable.

In epipolar geometry, it is known that corresponding points $(p_1, p_2)$ in two images of a static 3D scene satisfy the epipolar constraint, $p_1^T F p_2 = 0$. Embodiments find F by solving a weighted version of the epipolar constraint with the fitting weights $W_{fit}$ using the DLT algorithm for all the points in the image. In the problem formulation to obtain F, $p_1$ is a point in the image 1 and $p_2 = p_1 + O_L(p_1)$ is the corresponding point in image 2. The output of the global motion estimation block is the fundamental matrix F.

Thus, in some embodiments, optical flow estimation includes applying epipolar constraints to the fundamental matrix F and to the local optical flow estimate OL to obtain a second global flow estimate OG, and then estimating, by a second neural network, a plurality of fusion weights Wfuse based on the second global flow estimate OG, the plurality of features A, and the local optical flow estimate OL. Finally, the fused optical flow estimate is obtained in some embodiments by applying the plurality of fusion weights to the second global flow estimate OG and to the local optical flow estimate OL.

The fundamental matrix F is applied in motion fusion 11. Further details of motion fusion 11, for an embodiment, are provided in FIG. 4B. The optical flow estimate OL and fundamental matrix F are used in applying epipolar constraints (item 27) to obtain a constrained optical flow OG. The constrained optical flow OG, optical flow estimate OL and features A are used to estimate fusion weights (item 29, which is a neural network). For training of the neural network of item 29, see Table 2.

Motion fusion 11 starts by converting the global motion estimate (F) into an optical flow representation that can then be used for fusion with the optical flow estimate $O_L$. To convert F to an optical flow, the epipolar constraint is applied and each $p_2$ is projected to the corresponding epipolar line $p_1^T F$, obtaining a new estimate $p_2'$. Constrained optical global flow is then defined as $O_G(p_1) = p_2' - p_1$. Global and local flows are then combined using a weighted average with weights $W_{fuse}$ at each pixel FIG. 4B, item 31). These weights are estimated using another convolutional neural subnetwork as seen in item 29 of FIG. 4B. The final output is the fused optical flow $O_F$.

FIG. 5 illustrates an alternative embodiment for global motion estimation 7. The features A are input to a neural network to estimate global motion (item 33), and a global motion estimate OG is obtained as the output. That is, instead of fitting a global motion model to the local optical flow using the estimated weights $W_{fit}$, as in FIG. 4A, FIG. 5 illustrates estimating global motion directly using a neural network. This can be done for any global motion model, and not only for estimation of fundamental matrix F. The neural network of item 33 is trained as described below with respect to Table 2.

Thus, in some embodiments, global motion estimation includes estimating, based on the features A and using a third neural network, the global optical flow estimate OG.

Figure 6:
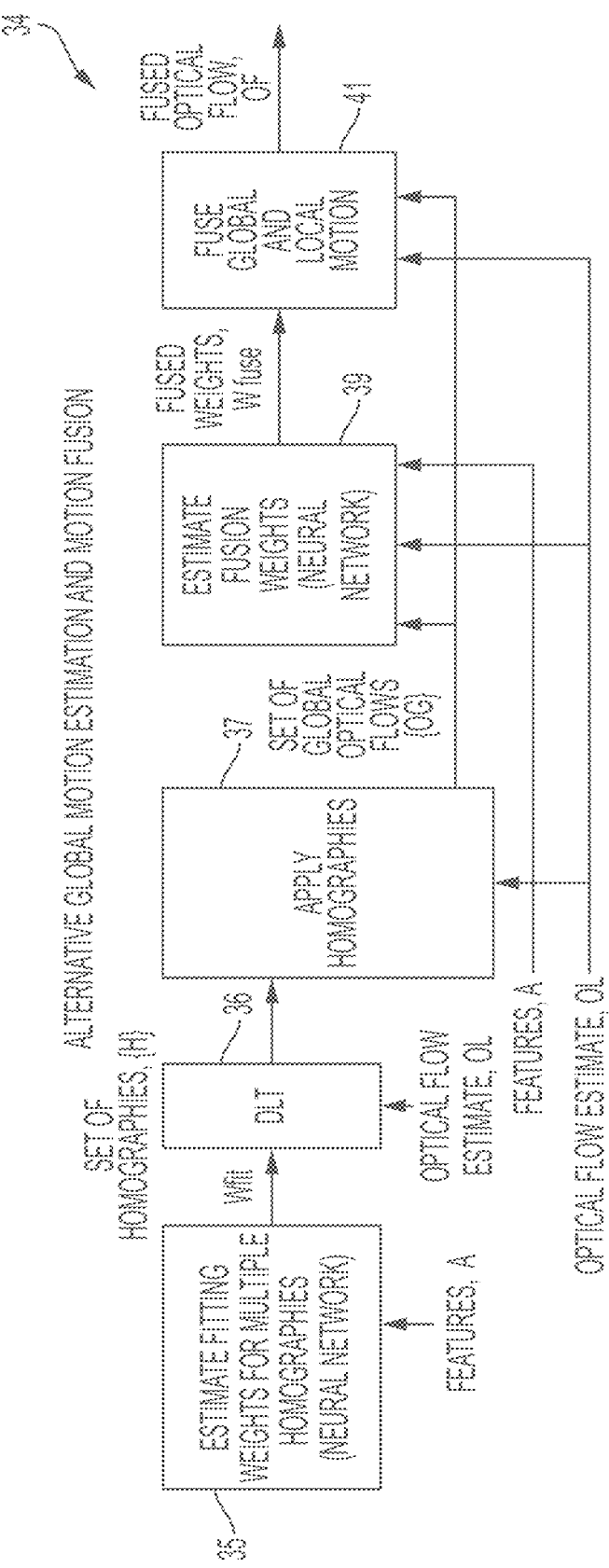
FIG. 6 illustrates an alternative embodiment for obtaining a fused optical flow.

FIG. 6 illustrates a system 34, which is an alternative embodiment for global motion estimation 7 and motion fusion 11. The fused optical flow OF is obtained based on a set of homographies {H} instead of based on the fundamental matrix F.

That is, in FIG. 6, one or more homographies {H} are fit instead of a fundamental matrix F. A single homography H is sufficient for a good estimate of global motion of a distant scene, which is a common situation in landscape or urban photography. Multiple homographies (two or more) can be used to effectively approximate any static scene motion, even for close-up scenes. The advantage of homographies {H} over the fundamental matrix F is that the use of homographies provides a much stronger global constraint, making motion fusion 11 more robust and effective using FIG. 6 rather than FIG. 4A. To use homographies, embodiments predict a multi-channel (W×H×K) $W_{fit}$ tensor using the features A, where K is the number of homographies. See item 35 of FIG. 6 in which fitting weights are estimated for multiple homographies using a neural network. Weighted DLT is then used to fit a separate homography using the optical flow estimate (OL) and weights from each channel of $W_{fit}$. See FIG. 6 item 36. The result is a set of homographies $\{H_i\}_{i=1}^K$, written in shorthand form as {H}.

Motion fusion then commences with applying the homographies {H}. See item 37 of FIG. 6. Generating global optical flow is much simpler using the homographies than with the fundamental matrix and is defined as $p_2' = H_i p_1$, $O_G^i(p_1) = p_2' - p_1$. There are now K global motion models and therefore K global optical flows. To fuse these optical flows with the local optical flow, embodiments estimate fusion weights $W_{fuse}$ as before (using OG obtained from {H}, features A and optical flow estimate OL), but $W_{fuse}$ is now a W×H×K tensor. See item 39. At each pixel, these weights are then used to compute a weighted average between all the global flows and the local flow, to obtain the fused flow $O_F$. See item 41.

Homography estimation may be performed by well-known techniques.

Figure 7:
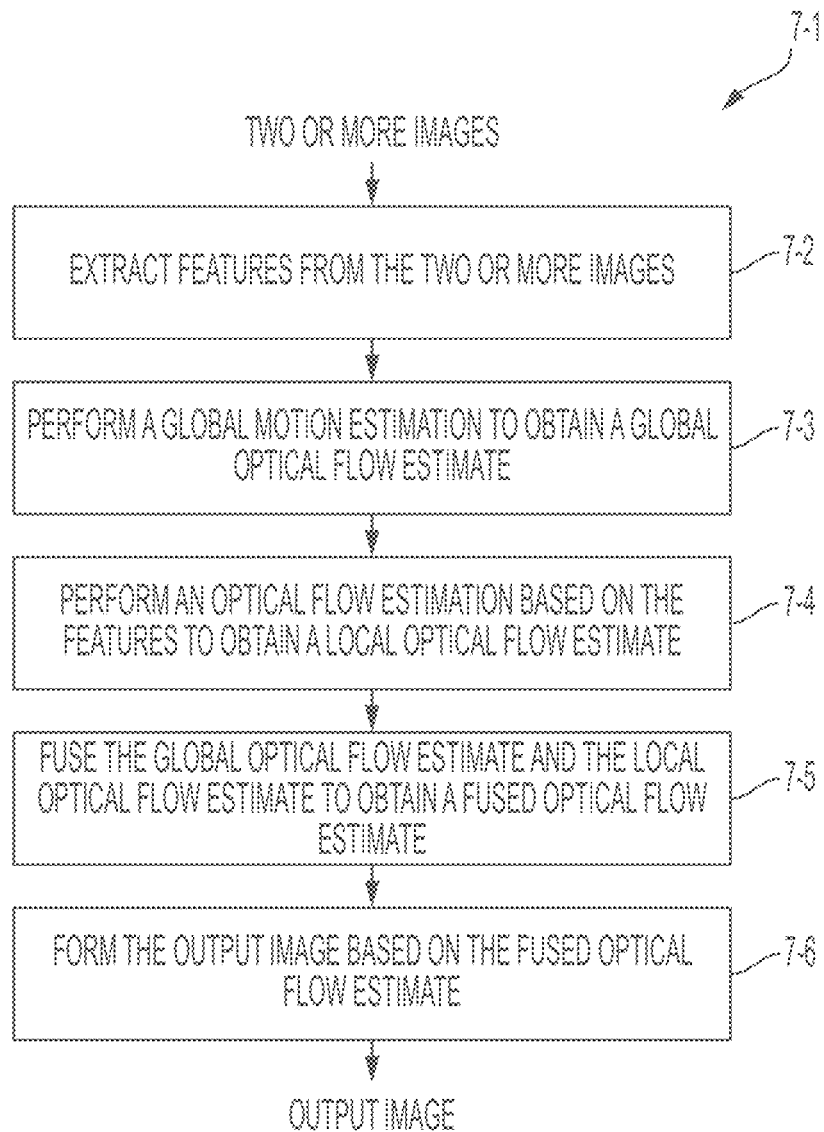
FIG. 7 illustrates example logic for forming an output image based on a fused optical flow estimate, according to some embodiments.

FIG. 7 illustrates exemplary logic 7-1 for obtaining an output image from two or more images. At operation 7-2, features are extracted from the two or more images. At operation 7-3, global motion estimation is performed to obtain a global flow estimate. At operation 7-4, an optical flow estimation is performed based on the features to obtain a local optical flow estimate. At operation 7-5, the global optical flow estimate and the local optical flow estimate are fused to obtain a fused optical flow estimate. At operation 7-6, the output image is then formed based on the fused optical flow estimate. This last operation can be performed by warping and combining as indicated in FIG. 1 at items 13 and 17.

Thus, in some embodiments, the fusing the global optical flow estimate and the local optical flow estimate includes predicting, using a fourth neural network, K homographies based on the plurality of features, wherein K is one or more. The predicting may include fitting weights using the fourth neural network to obtain second robust weights Wfit, and fitting, using a DLT, one of the K homographies to at least a portion of the second robust weights. In some embodiments, to obtain the fused optical flow estimate, the K homographies are applied to the plurality of images or to the features A to obtain K global optical flows, a fifth neural network then estimates a plurality of fusion weights Wfuse based on the K global optical flows, the plurality of features A, and the plurality of estimated optical flows. The fusing the global optical flow estimate and the local optical flow estimate may include fusing the global optical flow estimate and the local optical flow estimate using the plurality of fusion weights.

Table 1 provides example performance of the embodiment of FIG. 1 in terms of accuracy of the fused optical flow. In Table 1, Low noise means adding Gaussian noise with sigma (a, standard deviation) of 5 grayscale levels and High noise means Gaussian with σ=15. For reference, the image values are in a range of 0, . . . , 255.

TABLE 1

|  | No Noise | | Low noise | | High noise | |
| --- | --- | --- | --- | --- | --- | --- |
|  | EPE ↓ | EPE$_B$ ↓ | EPE ↓ | EPE$_B$ ↓ | EPE ↓ | EPE$_B$ ↓ |
| PWCNet | 1.42 | 0.43 | 1.55 | 0.54 | 2.31 | 0.96 |
| PWCNet-H | 1.38 | 0.4 | 1.48 | 0.49 | 2.11 | 0.89 |
|  | (−2.8%) | (−6.9%) | (−4.5%) | (−11.1%) | (−8.6%) | (−7.2%) |

The data of Table 1 was obtained by integrating global motion estimation and motion fusion embodiments into the PWCNet deep network for optical flow estimation, which provides an out-of-the-box alignment method. In Table 1, the original PWCNet method and the PWCNet-H of embodiments (where a single homography is used to model global motion) are compared. Training and evaluation of both methods is based on the FlyingChairs dataset, one of the standard datasets used for optical flow training and evaluation that contains a combination of global and local motion. End-Point-Error (EPE) is used for evaluation, which is the average error between the estimated and ground truth optical flow.

From Table 1, embodiments provide an improvement in each of the conditions no noise, small noise and high noise.

The neural networks of various embodiments are listed in Table 2.

TABLE 2

| Label for neural network | FIG. item | Input | Output |
|---|---|---|---|
| NN 1 | FIG. 4A item 21 | Features A | Fitting Weights Wfit |
| NN 2 | FIG. 4B item 29 | Constrained Global Optical Flow OG, Optical Flow Estimate OL, Features A | Fused Weights Wfuse |
| NN 3 | FIG. 5 item 33 | Features A | Global Motion Estimate OG |
| NN 4 | FIG. 6 item 35 | Constrained Global Optical Flow OG | Set of Homographies {H} |
| NN 5 | FIG. 6 item 39 | Set of Global Optical Flows {OG}, Features A, Optical Flow Estimate OL | Fused Weights Wfuse |

The neural networks of Table 2, in some embodiments, are trained using the flying chairs dataset. Training techniques for supervised learning are known.

As a non-limiting example, NN 1, NN 2, NN 4, and NN 5 may implemented with a sequence of 1-3 Cony layers with 3×3 kernels interleaved with LeakyRelu activation layers.

Also, NN 3 may be implemented using conventional techniques related to homography and related to the fundamental matrix.

Figure 8:
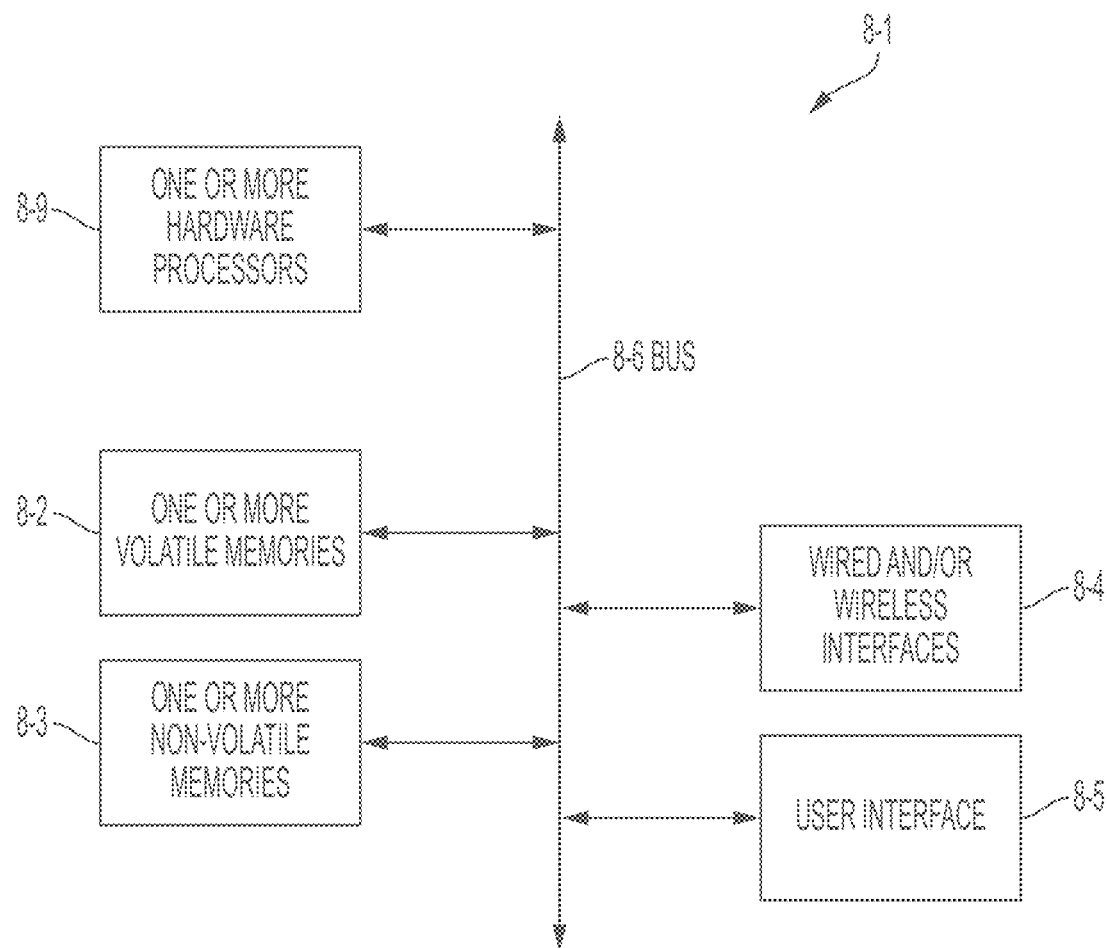
FIG. 8 illustrates exemplary hardware for implementation of computing devices for implementing the systems and algorithms described by the figures, according to some embodiments.

Hardware for performing embodiments provided herein is now described with respect to FIG. 8. FIG. 8 illustrates an exemplary apparatus 8-1 for implementation of the embodiments disclosed herein. The apparatus 8-1 may be a server, a computer, a laptop computer, a handheld device, or a tablet computer device, for example. Apparatus 8-1 may include one or more hardware processors 8-9. The one or more hardware processors 8-9 may include an ASIC (application specific integrated circuit), CPU (for example CISC or RISC device), and/or custom hardware. Apparatus 8-1 also may include a user interface 8-5 (for example a display screen and/or keyboard and/or pointing device such as a mouse). Apparatus 8-1 may include one or more volatile memories 8-2 and one or more non-volatile memories 8-3. The one or more non-volatile memories 8-3 may include a non-transitory computer readable medium storing instructions for execution by the one or more hardware processors 8-9 to cause apparatus 8-1 to perform any of the methods of embodiments disclosed herein.

What is claimed is:

1. A method of forming an output image, the method comprising:
    extracting a plurality of features from a plurality of images, the plurality of features comprising a plurality of first features associated with a first image of the plurality of images and a plurality of second features associated with a second image of the plurality of images;
    performing a global motion estimation based on the plurality of features to obtain a global optical flow estimate;
    performing an optical flow estimation based on the plurality of features to obtain a local optical flow estimate;
    fusing the global optical flow estimate and the local optical flow estimate to obtain a fused optical flow estimate; and
    forming the output image based on the fused optical flow estimate, wherein the performing the global motion estimation comprises:
        estimating, based on the plurality of features, fitting weights using a first neural network to obtain robust weights; and
        motion fitting, using a direct linear transform (DLT), based on the robust weights and based on the local optical flow estimate to obtain the global optical flow estimate, wherein the global optical flow estimate comprises a fundamental matrix.

2. The method of claim 1, further comprising warping the second image based on the fused optical flow estimate to obtain a warped second image,
    wherein the forming the output image comprises combining the first image with the warped second image to obtain the output image.

3. The method of claim 1, wherein the performing the optical flow estimation comprises:
    applying epipolar constraints to the fundamental matrix and to the local optical flow estimate to obtain a second global flow estimate;
    estimating, by a second neural network, a plurality of fusion weights based on the second global flow estimate, the plurality of features, and the local optical flow estimate; and
    obtaining the fused optical flow estimate by applying the plurality of fusion weights to the second global flow estimate and to the local optical flow estimate.

4. The method of claim 1, wherein the performing the global motion estimation comprises estimating, based on the plurality of features and using a third neural network, the global optical flow estimate.

5. The method of claim 1, wherein the fusing the global optical flow estimate and the local optical flow estimate comprises:
    predicting, using a fourth neural network, K homographies based on the plurality of features, wherein K is one or more, wherein the predicting further comprises:
        fitting weights using the fourth neural network to obtain second robust weights, and
        fitting, using a direct linear transform (DLT), one of the K homographies to at least a portion of the second robust weights;
    applying the K homographies to the local optical flow estimate to obtain K global optical flows; and
    estimating, by a fifth neural network, a plurality of fusion weights based on the K global optical flows, the plurality of features, and the local optical flow estimate,
    wherein the fusing the global optical flow estimate and the local optical flow estimate comprises fusing the global optical flow estimate and the local optical flow estimate using the plurality of fusion weights.

6. The method of claim 5, wherein K is two or more, the method further comprising:
fitting, using the DLT, a first homography of the K homographies to the plurality of first features; and
fitting, using the DLT, a second homography of the K homographies to the plurality of second features.

7. An apparatus for forming an output image, the apparatus comprising:
one or more processors; and
one or more memories, the one or more memories storing instructions configured to cause the apparatus to at least:
extract a plurality of features from a plurality of images, the plurality of features comprising a plurality of first features associated with a first image of the plurality of images and a plurality of second features associated with a second image of the plurality of images;
perform a global motion estimation based on the plurality of features to obtain a global optical flow estimate;
perform an optical flow estimation based on the plurality of features to obtain a local optical flow estimate;
fuse the global optical flow estimate and the local optical flow estimate to obtain a fused optical flow estimate; and
form the output image based on the fused optical flow estimate,
wherein the perform the global motion estimation comprises:
estimating, based on the plurality of features, fitting weights using a first neural network to obtain robust weights; and
motion fitting, using a direct linear transform (DLT), based on the robust weights and based on the local optical flow estimate to obtain the global optical flow estimate, wherein the global optical flow estimate comprises a fundamental matrix.

8. The apparatus of claim 7, wherein the instructions are further configured to cause the apparatus to warp the second image based on the fused optical flow estimate to obtain a warped second image,
wherein the instructions are further configured to cause the apparatus to form the output image by combining the first image with the warped second image to obtain the output image.

9. The apparatus of claim 7, wherein the instructions are further configured to cause the apparatus to the perform the optical flow estimation by:
applying epipolar constraints to the fundamental matrix and to the local optical flow estimate to obtain a second global flow estimate;
estimating, by a second neural network, a plurality of fusion weights based on the second global flow estimate, the plurality of features, and the local optical flow estimate; and
obtaining the fused optical flow estimate by applying the plurality of fusion weights to the second global flow estimate and to the local optical flow estimate.

10. The apparatus of claim 7, wherein the instructions are further configured to cause the apparatus to perform the global motion estimation by estimating, based on the plurality of features and using a third neural network, the global optical flow estimate.

11. The apparatus of claim 7, wherein the instructions are further configured to cause the apparatus to fuse the global optical flow estimate and the local optical flow estimate by:
predicting, using a fourth neural network, K homographies based on the plurality of features, wherein K is one or more, wherein the predicting further comprises:
fitting weights using the fourth neural network to obtain second robust weights, and
fitting, using a direct linear transform (DLT), one of the K homographies to at least a portion of the second robust weights;
applying the K homographies to the local optical flow estimate to obtain K global optical flows; and
estimating, by a fifth neural network, a plurality of fusion weights based on the K global optical flows, the plurality of features, and the local optical flow estimate,
wherein the fusing the global optical flow estimate and the local optical flow estimate comprises fusing the global optical flow estimate and the local optical flow estimate using the plurality of fusion weights.

12. The apparatus of claim 11, wherein K is two or more, wherein the instructions are further configured to cause the apparatus to:
fit, using the DLT, a first homography of the K homographies to the plurality of first features; and
fit, using the DLT, a second homography of the K homographies to the plurality of second features.

13. A non-transitory computer readable medium storing instructions for forming an output image, the instructions configured to cause a computer to at least:
extract a plurality of features from a plurality of images, the plurality of features comprising a plurality of first features associated with a first image of the plurality of images and a plurality of second features associated with a second image of the plurality of images;
perform a global motion estimation based on the plurality of features to obtain a global optical flow estimate;
perform an optical flow estimation based on the plurality of features to obtain a local optical flow estimate;
fuse the global optical flow estimate and the local optical flow estimate to obtain a fused optical flow estimate; and
form the output image based on the fused optical flow estimate,
wherein the perform the global motion estimation comprises:
estimating, based on the plurality of features, fitting weights using a first neural network to obtain robust weights; and
motion fitting, using a direct linear transform (DLT), based on the robust weights and based on the local optical flow estimate to obtain the global optical flow estimate, wherein the global optical flow estimate comprises a fundamental matrix.

14. The non-transitory computer readable medium of claim 13, wherein the instructions are further configured to cause the computer to warp the second image based on the fused optical flow estimate to obtain a warped second image,
wherein the instructions are further configured to cause the apparatus to form the output image by combining the first image with the warped second image to obtain the output image.

15. The non-transitory computer readable medium of claim 13, wherein the instructions are further configured to cause the computer to the perform the optical flow estimation by:
applying epipolar constraints to the fundamental matrix and to the local optical flow estimate to obtain a second global flow estimate;

estimating, by a second neural network, a plurality of fusion weights based on the second global flow estimate, the plurality of features, and the local optical flow estimate; and obtaining the fused optical flow estimate by applying the plurality of fusion weights to the second global flow estimate and to the local optical flow estimate.

16. The non-transitory computer readable medium of claim 13, wherein the instructions are further configured to cause the computer to perform the global motion estimation by estimating, based on the plurality of features and using a third neural network, the global optical flow estimate.

17. The non-transitory computer readable medium of claim 13, wherein the instructions are further configured to cause the computer to fuse the global optical flow estimate and the local optical flow estimate by:

predicting, using a fourth neural network, K homographies based on the plurality of features, wherein K is one or more, wherein the predicting further comprises:
fitting weights using the fourth neural network to obtain second robust weights, and
fitting, using a direct linear transform (DLT), one of the K homographies to at least a portion of the second robust weights;
applying the K homographies to the local optical flow estimate to obtain K global optical flows; and
estimating, by a fifth neural network, a plurality of fusion weights based on the K global optical flows, the plurality of features, and the local optical flow estimate,
wherein the fusing the global optical flow estimate and the local optical flow estimate comprises fusing the global optical flow estimate and the local optical flow estimate using the plurality of fusion weights.

* * * * *